(12) United States Patent
Young et al.

(10) Patent No.: US 8,665,555 B1
(45) Date of Patent: Mar. 4, 2014

(54) DISK DRIVE WITH ADDED EXTERNAL LABYRINTH PATH DURING SERVO TRACK WRITING

(75) Inventors: Lionel Young, San Francisco, CA (US); John R. Gustafson, Los Gatos, CA (US); Scott E. Watson, San Jose, CA (US); Dana C. Fisher, Berthoud, CO (US); Brian L. Rappel, Lyons, CO (US); Andrew A. Lucas, Lyons, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 819 days.

(21) Appl. No.: 12/826,474

(22) Filed: Jun. 29, 2010

(51) Int. Cl.
*G11B 33/14* (2006.01)

(52) U.S. Cl.
USPC ............................ 360/97.18; 360/99.15

(58) Field of Classification Search
USPC .......... 360/97.18, 99.15, 99.16, 99.17, 99.18
See application file for complete search history.

(56) References Cited

U.S. PATENT DOCUMENTS

| | | | |
|---|---|---|---|
| 5,030,260 A | 7/1991 | Beck et al. | |
| 5,307,222 A * | 4/1994 | Dion | 360/97.18 |
| 5,367,417 A * | 11/1994 | Brown et al. | 360/97.18 |
| 5,417,743 A * | 5/1995 | Dauber | 96/13 |
| 5,481,420 A * | 1/1996 | Cardona et al. | 360/99.06 |
| 5,754,365 A * | 5/1998 | Beck et al. | 360/97.18 |
| 5,877,915 A | 3/1999 | Ishida | |
| 5,997,614 A * | 12/1999 | Tuma et al. | 96/4 |
| 6,088,190 A | 7/2000 | Anderson | |
| 6,128,159 A * | 10/2000 | Ino | 360/97.16 |
| 6,214,070 B1 * | 4/2001 | Crowder et al. | 55/320 |
| 6,285,524 B1 * | 9/2001 | Boigenzahn et al. | 360/99.13 |
| 6,296,691 B1 * | 10/2001 | Gidumal | 96/17 |
| 6,475,269 B1 * | 11/2002 | Turner | 96/134 |
| 6,618,221 B2 | 9/2003 | Gillis et al. | |
| 6,618,222 B1 * | 9/2003 | Watkins et al. | 360/97.18 |
| 6,644,362 B2 | 11/2003 | Bernett | |
| 6,646,821 B2 | 11/2003 | Bernett et al. | |
| 6,683,747 B2 | 1/2004 | Bernett | |
| 6,785,082 B2 | 8/2004 | Fiorvanti et al. | |
| 6,785,089 B2 | 8/2004 | Bernett et al. | |
| 6,819,517 B2 | 11/2004 | Fioravanti et al. | |
| 6,824,595 B2 * | 11/2004 | Ueki et al. | 96/134 |
| 6,898,043 B2 | 5/2005 | Fioravanti | |
| 6,914,742 B1 | 7/2005 | Fioravanti et al. | |
| 6,972,927 B2 * | 12/2005 | Hong et al. | 360/97.18 |
| 6,999,262 B2 | 2/2006 | Han et al. | |
| 7,064,920 B2 | 6/2006 | Fujiwara et al. | |
| 7,130,149 B2 * | 10/2006 | Hong et al. | 360/97.18 |
| 7,199,963 B2 | 4/2007 | Fukushima | |
| 7,209,319 B1 * | 4/2007 | Watkins et al. | 360/97.18 |
| 7,271,974 B2 | 9/2007 | Fukuyama et al. | |
| 7,274,534 B1 * | 9/2007 | Choy et al. | 360/97.18 |
| 7,398,590 B1 | 7/2008 | Mann et al. | |
| 7,408,737 B2 | 8/2008 | Fukushima et al. | |

(Continued)

*Primary Examiner* — Brian Miller (57) ABSTRACT

A disk drive includes an enclosure that has a breather port therethrough. A first labyrinth path may be disposed inside the disk drive enclosure, in fluid connection with the breather port. A second labyrinth path may be temporarily disposed outside the disk drive enclosure, in fluid connection with the breather port. An alternative gas such as helium may be allowed to bleed out through the second labyrinth path during a period of servo track writing. The second labyrinth path may be removed after servo track writing.

10 Claims, 7 Drawing Sheets

(56) References Cited

U.S. PATENT DOCUMENTS

| | | | |
|---|---|---|---|
| 7,420,771 B1 * | 9/2008 | Hanke et al. | 360/99.18 |
| 2003/0089417 A1 | 5/2003 | Bernett | |
| 2005/0092178 A1 | 5/2005 | Lim et al. | |
| 2006/0044675 A1 | 3/2006 | Fukushima et al. | |
| 2008/0212237 A1 | 9/2008 | Uefune et al. | |
| 2008/0310048 A1 | 12/2008 | Hirono et al. | |

* cited by examiner

DISK DRIVE WITH ADDED EXTERNAL LABYRINTH PATH DURING SERVO TRACK WRITING

BACKGROUND

Magnetic hard disk drives are an example of information storage devices. Other information storage devices having some common or similar components or architecture include: magneto-optical disk drives, optical disk drives, tape drives, and removable media disk drives.

In magnetic recording applications, the head typically includes a slider and a magnetic transducer that comprises a writer and a read element. In optical recording applications, the head may include a minor and an objective lens for focusing laser light onto an adjacent disk surface. The slider is separated from the disk by a gas film that is typically referred to as an "air bearing." The term "air bearing" is common because typically the gas is simply air. However, air bearing sliders have been designed for use in disk drive enclosures that contain alternative gases. For example, an inert gas like helium may be used because it does not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, it may not buffet components within the disk drive as much, which may reduce track misregistration and thereby improve track following capability—facilitating higher precision in servo track writing and servo track following, which may enable increased data storage densities.

However, it may still be preferable for the disk drive to be air-filled during its operational lifetime. It is well known that disk drive enclosures that are designed to contain an alternative gas must be hermetically sealed to prevent an unacceptable rate of gas leakage, and such hermetic sealing may present additional design challenges and cost. For example, undesirable deflection of the top cover of the disk drive enclosure may occur with changes in barometric pressure in hermetically sealed disk drives. By contrast, such deflection may be mitigated in disk drives that contain air and so can include a breather filter that allows atmospheric air to bleed into or out of the disk drive enclosure through a breather port to equilibrate the internal pressure within the disk drive with the external ambient air pressure. Humidity may also be advantageously equilibrated via the breather port.

In many air-filled disk drive designs, the fluid communication between the interior of the disk drive and the external environment (through the breather filter and breather port) may also be required to pass through a narrow passage referred to as a "labyrinth path" in order to limit the rate of flow and/or diffusion. The term "labyrinth path" as used herein does not necessitate turns and bends; rather it refers to a narrow path that is longer than it is wide and restricts the rate of gas diffusion; it might have many turns and bends or it might be straight. The labyrinth may be part of the breather filter, or alternatively may be fabricated as a groove or depression in the base or cover.

One potentially advantageous trade-off that may be stricken between air-filled disk drive designs and alternative-gas-filled disk drive designs, is to (A) design the disk drive to operate as air-filled during its useful lifetime, for example so that it can employ a breather filter and breather port, but (B) temporarily fill the disk drive with an alternative gas like helium during a particular portion of the disk drive manufacturing process (e.g. servo track writing) that may benefit most thereby (e.g. from higher precision servo track positioning or a temporarily reduced flying height).

However, accomplishing this advantageous trade-off requires a practical method to fill and replace the gas within the disk drive enclosure in a high-volume manufacturing environment. One proposed method requires removal of the disk drive top cover, while another requires leaving open a large hole in the disk drive top cover, so that the gas inside may be changed quickly in serial fashion. However, according to such proposed methods the disk drive is in a condition unsuitable for use outside of an artificially clean environment (e.g. a clean room or clean hood). High-volume manufacturing operations that must be accomplished in clean rooms may be prohibitively burdensome and costly.

Certain proposed methods attempt to prevent leakage of an alternative gas from the disk drive during servo track writing. However, in that case if leakage of an alternative gas like helium occurs, such leakage may greatly exceed replacement by air, so that the pressure inside of the disk drive may unacceptably drop and/or cause deflection of the disk drive cover during servo track writing. Thus, there is a need in the art for improved structures and practical methods to accomplish servo track writing during temporary introduction of an alternative gas into the disk drive enclosure.

DETAILED DESCRIPTION OF EXAMPLE EMBODIMENTS

Figure 1:
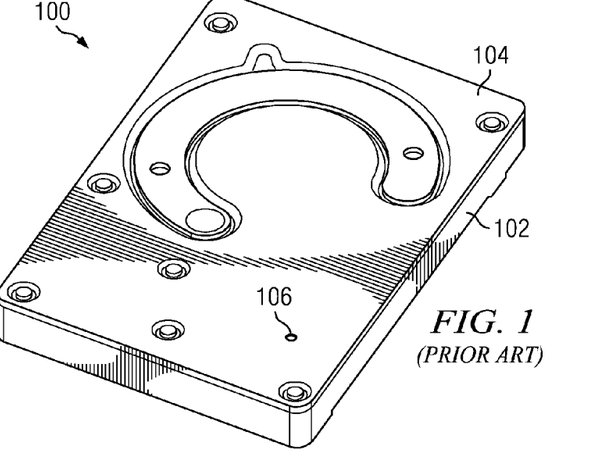
FIG. 1 depicts a top perspective view of a conventional disk drive.

FIG. 1 depicts a top perspective view of a conventional disk drive 100. The disk drive 100 includes a disk drive enclosure that includes a disk drive base 102 to which a disk drive cover 104 is attached. The disk drive cover 104 includes a breather port 106 therethrough.

Figure 2:
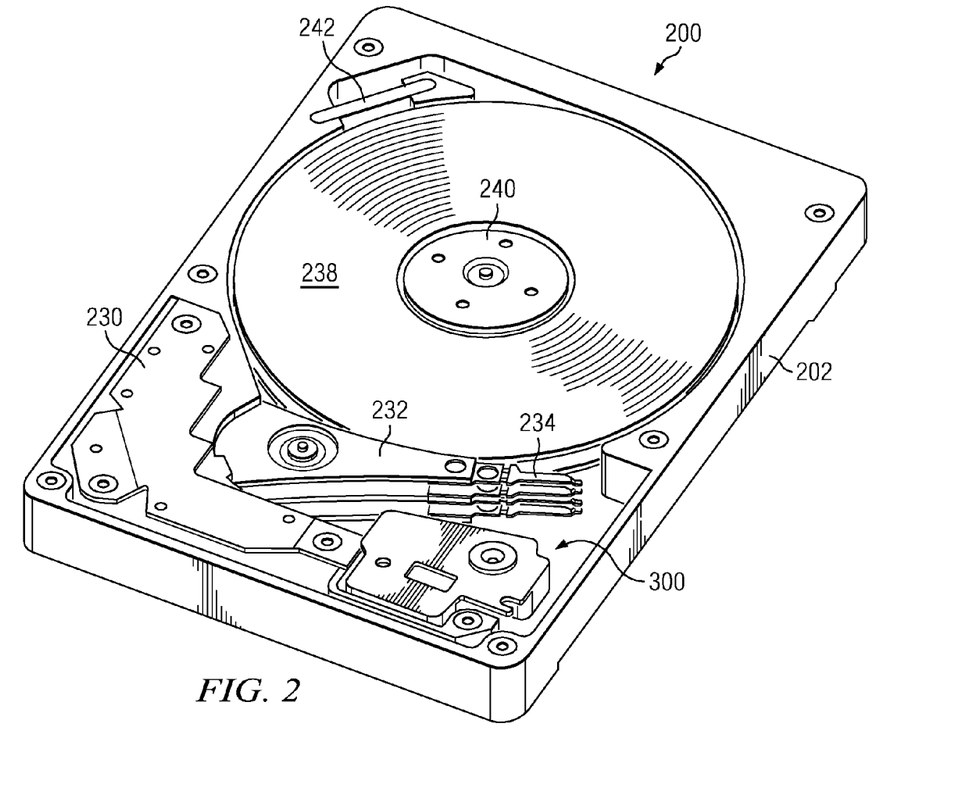
FIG. 2 is a top perspective view of a disk drive capable of use in an embodiment of the present invention, with the disk drive top cover removed to show some internal components.

FIG. 2 is a top perspective view of a disk drive 200 capable of use in an embodiment of the present invention, with the disk drive top cover removed to show some internal components. The disk drive 200 includes a breather filter 300 adjacent the disk drive base 202. The disk drive 200 also includes various other internal components within its enclosure, such as a voice coil motor 230, rotary actuator 232, at least one head suspension 234, at least one disk 238 mounted on a spindle motor 240 that is attached to the disk drive base 202, and a recirculation filter 242. Not all internal components of disk drive 200 are shown in FIG. 2. For example, a conventional head loading ramp may be positioned adjacent the disk(s) 238 to facilitate merging of the head suspensions 234 onto the disk(s) 238, but is not shown to provide a clearer view of the breather filter 300.

Figure 3:
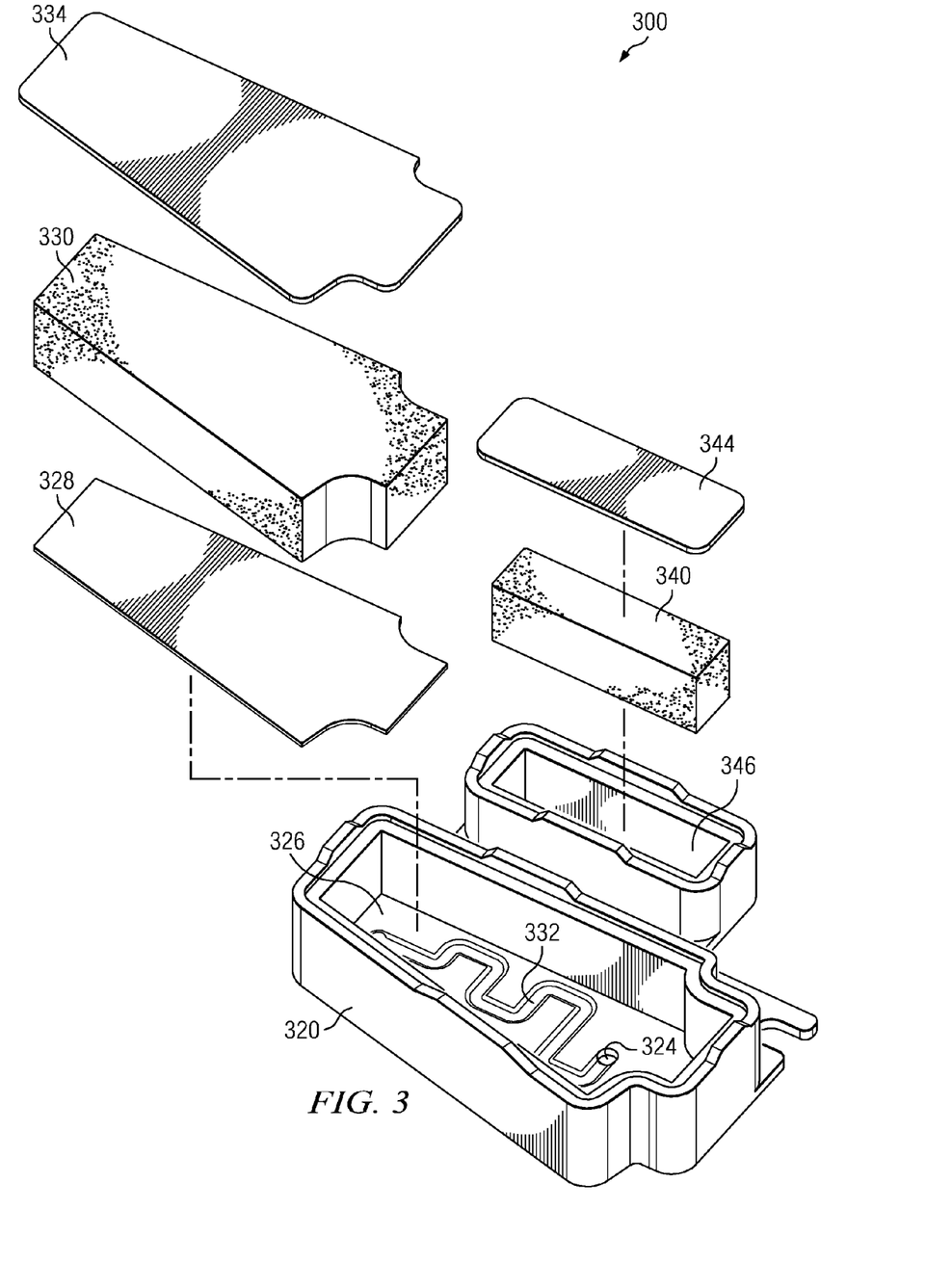
FIG. 3 is an exploded bottom perspective view of a disk drive breather filter capable of use in an embodiment of the present invention.

FIG. 3 is an exploded bottom perspective view of the disk drive breather filter 300. In the embodiment of FIG. 3, the breather filter 300 includes a breather filter housing 320 that is of rigid canister type, however a conventional flexible breather filter is also contemplated herein. In various embodiments, these breather filters may or may not include adsorbant carbon. In the embodiment of FIG. 3, the breather filter housing 320 includes an internal labyrinth path 332 that extends from an entrance port 324 to a primary internal cavity 326. In an alternative embodiment, a conventional flexible breather filter may include an internal labyrinth path fabricated in a sublayer of a laminate structure.

In the embodiment of FIG. 3, a labyrinth seal layer 328 adheres to the breather filter housing 320 inside the primary internal cavity 326 to seal the internal labyrinth path 332 over the entrance port 324 and along the internal labyrinth path 332 (except for a distal end of the internal labyrinth path 332 that remains open to the primary internal cavity 326). In this way, the labyrinth seal layer 328 effectively lengthens the gas diffusion path from the primary internal cavity 326 through the entrance port 324 to the outside of the breather filter housing 320, to include almost the entire internal labyrinth path length. The labyrinth seal layer 328 may comprise an impermeable polymer material, for example.

The length and other dimensions of the internal labyrinth path 332 may be chosen to slow gas flow or diffusion through the entrance port 324 into/from the primary internal cavity 326, to achieve a desired limited gas flow or limited diffusion rate under expected normal operating conditions. For example, in certain embodiments, the internal labyrinth path 332 may define an internal labyrinth path cross-sectional area that is preferably in the range 0.05 mm$^2$ to 1 mm$^2$ and an internal labyrinth path length that is preferably is in the range 5 mm to 80 mm. However, the limited gas flow or limited diffusion rate that is desired under expected normal operating conditions may be too great and undesirable under certain alternative gas conditions during the disk drive manufacturing process (e.g. during a servo writing process).

In the embodiment of FIG. 3, a primary adsorbant media 330 is disposed in the primary internal cavity 326, with the labyrinth seal layer 328 disposed between the primary adsorbant media 330 and the internal labyrinth path 332. The primary adsorbant media 330 may comprise an activated carbon material, for example, or various other adsorbant materials such as silica gel, activated alumina, sodium carbonate, calcium carbonate, potassium carbonate, sodium hydroxide, calcium hydroxide, calcium sulfate, and/or a powdered metal. Also in the embodiment of FIG. 3, a filter layer 334 covers the primary adsorbant media 330, and may be adhered to a periphery of the primary internal cavity 326 of the breather filter housing 320. The filter layer 334 may optionally comprise a porous polymer material such as a polytetrafluoroethylene (PTFE) membrane.

The breather filter 300 of the embodiment of FIG. 3 also optionally includes a secondary cavity 346 in the breather filter housing 320. Unlike the primary internal cavity 326, there is no gas diffusion path through the secondary cavity 346 to the outside of the disk drive enclosure (e.g. via the entrance port 324). A secondary adsorbant media 340 may be disposed within the secondary cavity 346. The secondary adsorbant media 340 may include silica gel, for example, or various other adsorbant materials such as activated carbon, activated alumina, sodium carbonate, calcium carbonate, potassium carbonate, sodium hydroxide, calcium hydroxide, calcium sulfate, and/or a powdered metal. A secondary filter layer 344 may cover the secondary adsorbant media 340, and the secondary filter layer 344 may comprise the same material as the filter layer 334.

Figure 4A:
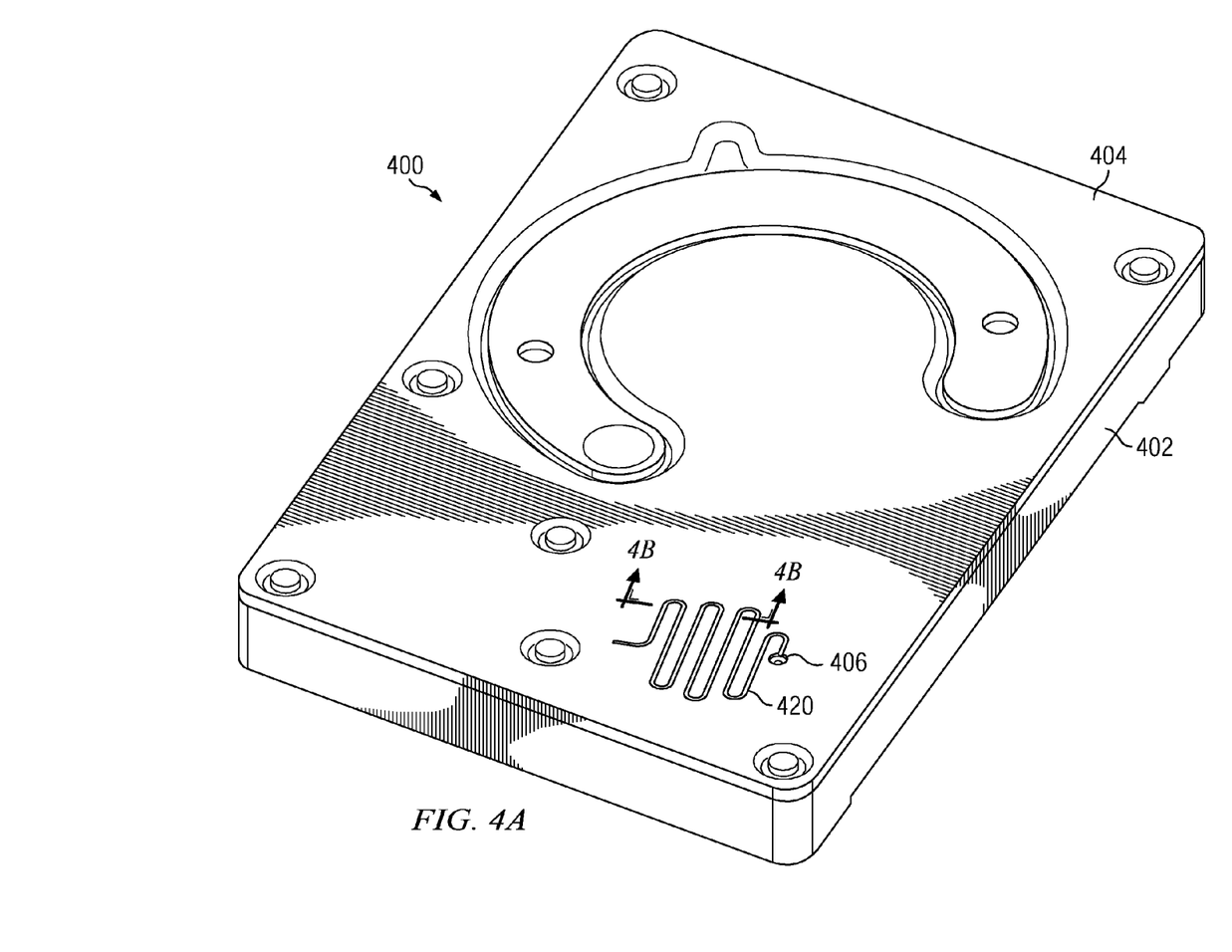
FIG. 4A is a top perspective view of a disk drive capable of use in an embodiment of the present invention.
Figure 4B:
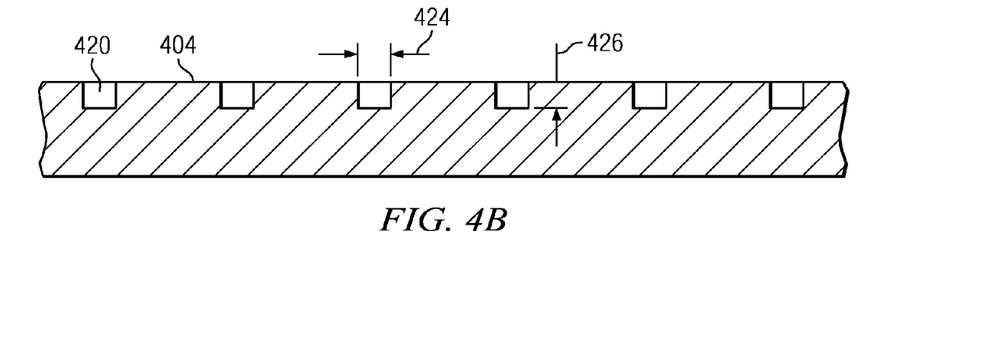
FIG. 4B is a cross sectional view of an external labyrinth channel in the top cover of the disk drive of FIG. 4A.
Figure 4C:
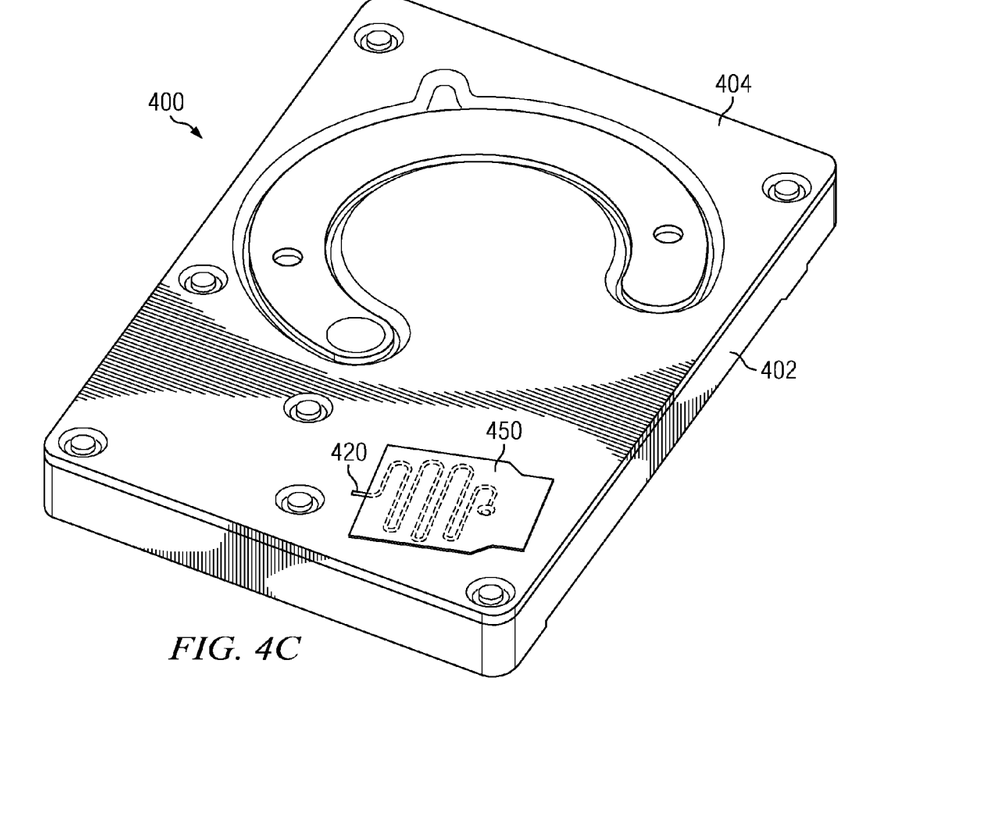
FIG. 4C depicts the disk drive of FIG. 4A with its external labyrinth channel partially covered by a removable layer, according to an embodiment of the present invention.

FIG. 4A is a top perspective view of a disk drive 400 capable of use in an embodiment of the present invention. FIG. 4B is a cross sectional view of an external labyrinth path 420 in the top cover 404 of the disk drive 400. FIG. 4C depicts disk drive 400 with its external labyrinth path 420 partially covered by a removable layer, according to an embodiment of the present invention. Now referring to FIGS. 4A-4C, the disk drive 400 includes a disk drive base 402 to which the disk drive cover 404 is attached to form a disk drive enclosure. The disk drive enclosure includes a breather port 406 therethrough.

The disk drive 400 may include a first labyrinth path (like the internal labyrinth path 332 of the breather filter 300 shown in FIG. 3) that is disposed inside the disk drive enclosure and that is in fluid connection with the breather port 406. The disk drive 400 also includes a second external labyrinth path 420 disposed outside the disk drive enclosure and in fluid connection with the breather port 406. In this regard, the first labyrinth path (internal like the internal labyrinth path 332 of the breather filter 300 shown in FIG. 3) and the second external labyrinth path 420 are both considered to be in fluid connection with the breather port 406, because they are both in the path of any flow through the breather port 406.

In the embodiment of FIGS. 4A-C, the external labyrinth path 420 comprises a channel in the cover 404 of the enclosure of the disk drive 400. In this regard, the external labyrinth path 420 is a channel disposed in an external surface of the enclosure of disk drive 400. Such a channel may be created by partial etching or forming into the cover 404 or the base 402 of the enclosure of disk drive 400. For example, a "formed channel" is a channel formed by indenting into the cover by a forming die without removing material, while a "partial etched channel" is etched into the enclosure by removal of material. One of ordinary skill can discern a formed channel from a partial etched channel by their resulting appearance and structural characteristics. For example, die roll rounded corners may be a tell-tale trace of a forming process, as may be a reverse image bump on the underside of the cover 404 opposite the channel. Also, the cover may have about the same thickness at the formed channel (because it is merely bent) while the thickness of the cover at the partial etched channel may be reduced by the etch depth. Alternatively, the channel may be created in the cover 404 or the base 402 of the enclosure of disk drive 400 by various other methods such as casting, machining, coining, or embossing, each with a telltale appearance and distinguishing structural characteristics.

In certain embodiments, the channel of the external labyrinth path 420 may define a width 424 that is preferably in the range 50 µm to 1600 µm, and/or a depth 426 that is preferably in the range 15 µm to 250 µm. Hence, in certain embodiments, the channel of the external labyrinth path 420 may define a greatest transverse dimension that is in the range 50 µm to 1600 µm. In certain embodiments, the channel of the external labyrinth path 420 may define channel length (total path length along straight and curved portions of the second labyrinth path 420) that is preferably in the range 30 mm to 460 mm. In certain embodiments, the channel of the external labyrinth path 420 may define a channel cross-sectional area that is preferably in the range 0.00075 $mm^2$ to 0.4 $mm^2$ and a channel length that is preferably in the range 30 mm to 460 mm. In certain embodiments, such dimensional ranges may advantageously control the rate of diffusion of an alternative gas like helium during a servo track writing process.

In the embodiment of FIGS. 4A-C, the external labyrinth path 420 may include a removable layer 450 that is adhered to the cover 404 of the enclosure of disk drive 400. The removable layer 450 may extend over part of the channel of the external labyrinth path 420, so that the channel may include a covered channel length that has a closed cross-section through which gas flow and diffusion into or out of the breather port 406 must take place. In the embodiment of FIG. 4C, if/when the removable layer is removed, the channel of the external labyrinth path 420 will become an open channel having an open cross-section. Such an open channel does not constrain gas flow and diffusion into or out of the breather port 406 since such gas flow and diffusion can simply bypass the channel. Note that in an alternative embodiment, the removable layer 450 may not be the entire cover over the external labyrinth path 420 (there being a region of the cover that is not removed), so that removal of the removable layer 450 may shorten the covered channel length without reducing the covered channel length all the way to zero.

Figure 5A:
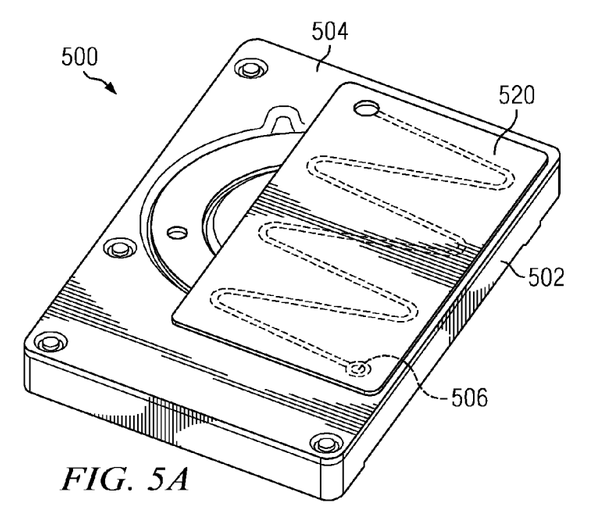
FIG. 5A is a top perspective view of a removable external labyrinth path positioned on a disk drive, according to another embodiment of the present invention.
Figure 5B:
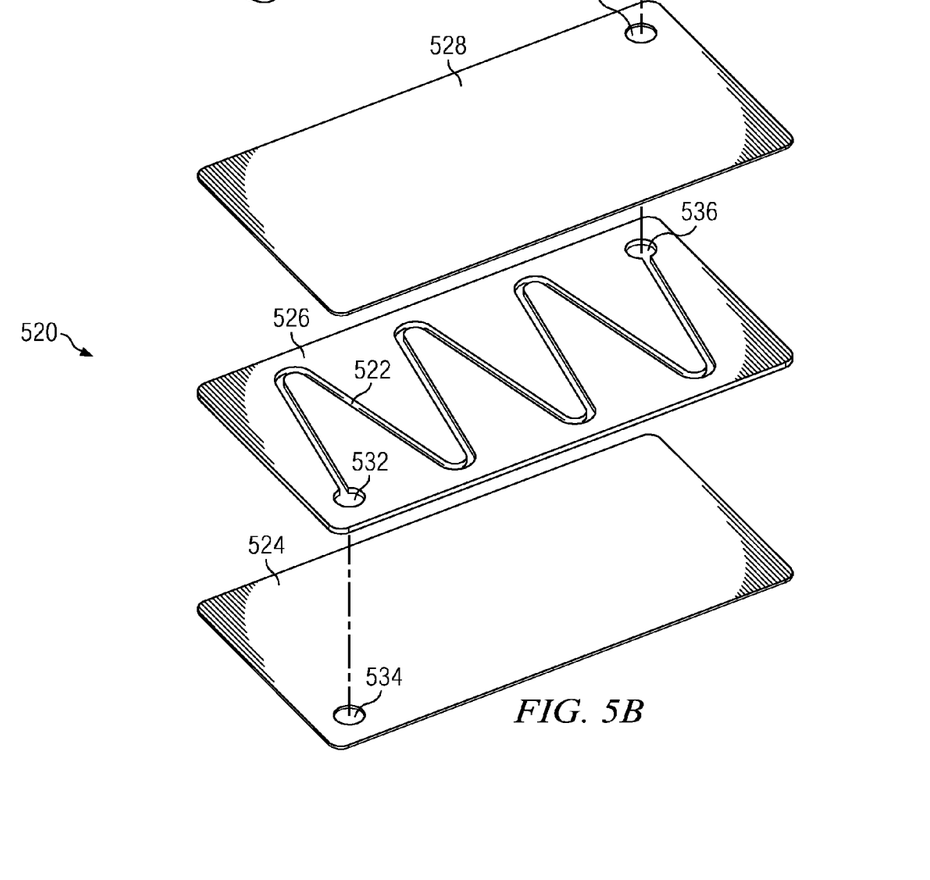
FIG. 5B is a top perspective exploded view of the removable external labyrinth path of FIG. 5A.

FIG. 5A is a top perspective view of a removable external labyrinth path 520 positioned on a disk drive 500, according to another embodiment of the present invention. FIG. 5B is a top perspective exploded view of the removable external labyrinth path 520 of FIG. 5A.

Now referring to FIGS. 5A-5B, the disk drive 500 includes a disk drive base 502 to which a disk drive cover 504 is attached to form a disk drive enclosure. The disk drive enclosure includes a breather port 506 therethrough. The disk drive 500 may include a first labyrinth path (like the internal labyrinth path 332 of the breather filter 300 shown in FIG. 3) that is disposed inside the disk drive enclosure and that is in fluid connection with the breather port 506. The disk drive 500 also includes a second external labyrinth path 520 that is disposed outside the disk drive enclosure and in fluid connection with the breather port 506. In this regard, the first labyrinth path (internal like the internal labyrinth path 332 of the breather filter 300 shown in FIG. 3) and the second external labyrinth path 520 are both considered to be in fluid connection with the breather port 506, because they are both in the path of any flow through the breather port 506.

In the embodiment of FIGS. 5A-5B, the external labyrinth path 520 includes a channel 522 in a first layer 526 that is adhered to the disk drive enclosure by means of an adhesive underlayer 524, and a second layer 528 that is adhered to the first layer 526 and that extends over at least part of the channel 522. In the embodiment of FIGS. 5A-5B, the channel 522 optionally has a zig-zag shape along its length. A first terminus 532 of the channel 522 and a hole 534 in the adhesive underlayer 524 may be aligned with the breather port 506 in the disk drive cover 504, while a second terminus 536 of the channel 522 may open to the external atmosphere via the hole 538 in the second layer 528. In this way, gas flow and diffusion from the breather port 506 to the external environment is constrained to pass through the external labyrinth path 520.

However, in the embodiment of FIG. 5B, at least the second layer 528 may be removable from the disk drive 500, and in certain embodiments the layers 524, 526, 528 together may be removable from the disk drive cover 504. After such removal, gas flow and diffusion from the breather port 506 to the external environment is no longer constrained to pass through the external labyrinth path 520. Alternatively, if only a portion of the second layer 528 is removed, then gas flow and diffusion from the breather port 506 to the external environment is no longer constrained to pass through any uncovered portion of the external labyrinth path 520.

Figure 5C:
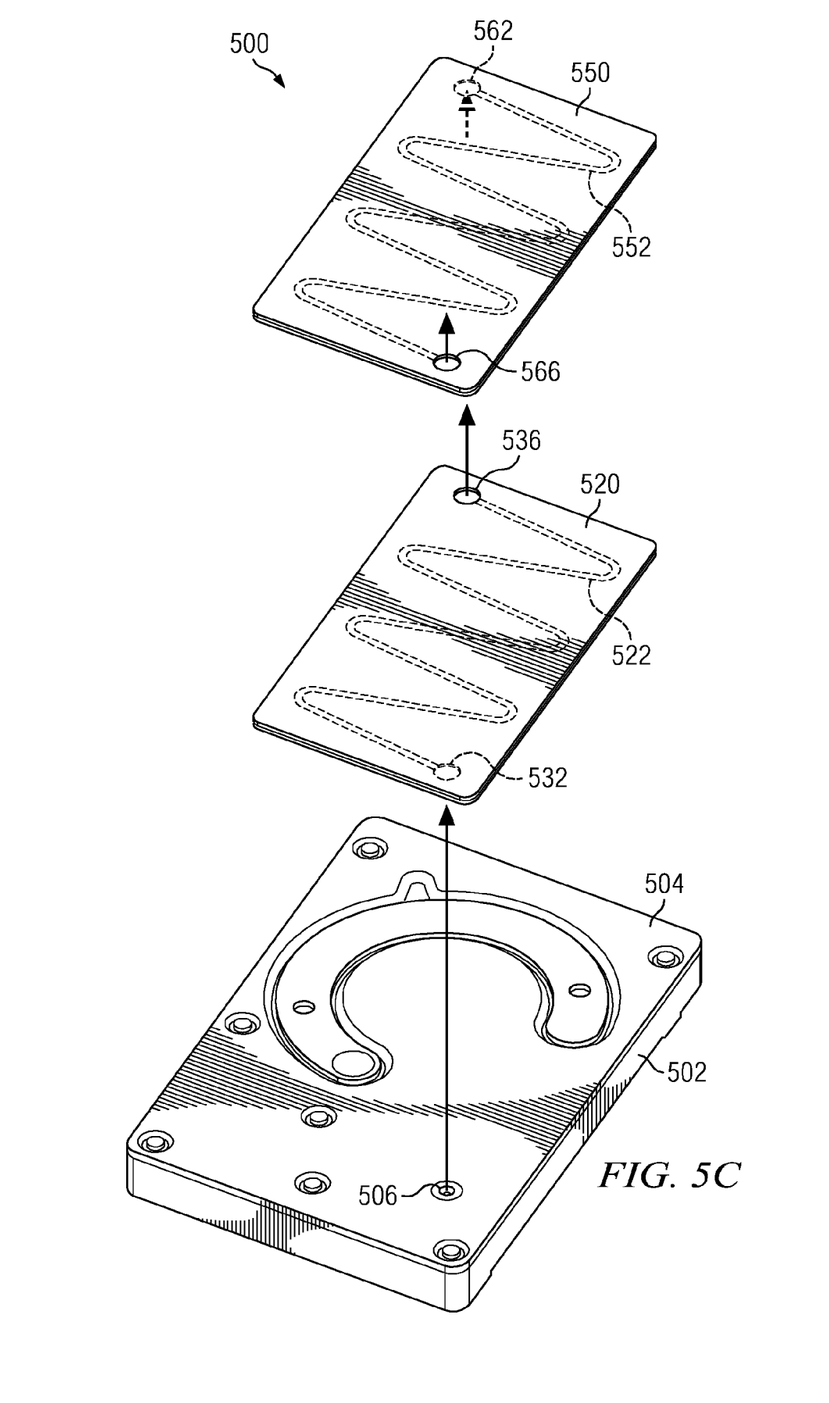
FIG. 5C is a top perspective exploded view of a disk drive having two removable external labyrinth paths positioned in series, according to another embodiment of the present invention.

FIG. 5C is a top perspective exploded view of the disk drive 500 in an alternative embodiment of the present invention having first and second removable external labyrinth paths 520 and 550, respectively that are positioned in series. Now referring additionally to FIG. 5C, a vertical arrow depicts gas flow and/or diffusion from the breather port 506 in the cover 504 of the enclosure of disk drive 500, into the channel 522 of the first external removable labyrinth path 520, via the first terminus 532 of channel 522. Further vertical arrows depict gas flow and/or diffusion from the channel 522 of the external labyrinth path 520 into a channel 552 of a second external labyrinth path 550, via the second terminus 536 of the channel 522 and a first terminus 562 of the channel 552. Finally, the gas flow and/or diffusion exits the channel 552 to the external atmosphere via a second terminus 566 of the channel 552.

In this way, the second removable external labyrinth path 550 is stacked on top of the first removable external labyrinth path 520 to substantially double the effective channel length that is presented to the gas flow and/or diffusion. Similar additional removable external labyrinth paths may be further stacked upon the second removable external labyrinth path 550, each in a position that is rotated 180° relative to the one beneath (in this embodiment), to conveniently achieve greater multiples of the effective channel length that is presented to the gas flow and/or diffusion. Notwithstanding the direction of the arrows shown in FIG. 5C, the direction of the gas flow and/or diffusion may be the reverse of that shown, so that gas flow and/or diffusion enters the disk drive 500 from the external atmosphere rather than (or in addition to) vice versa. Such gas flow and/or diffusion may be represented by arrows having the opposite sense as those shown in FIG. 5C.

Figure 6A:
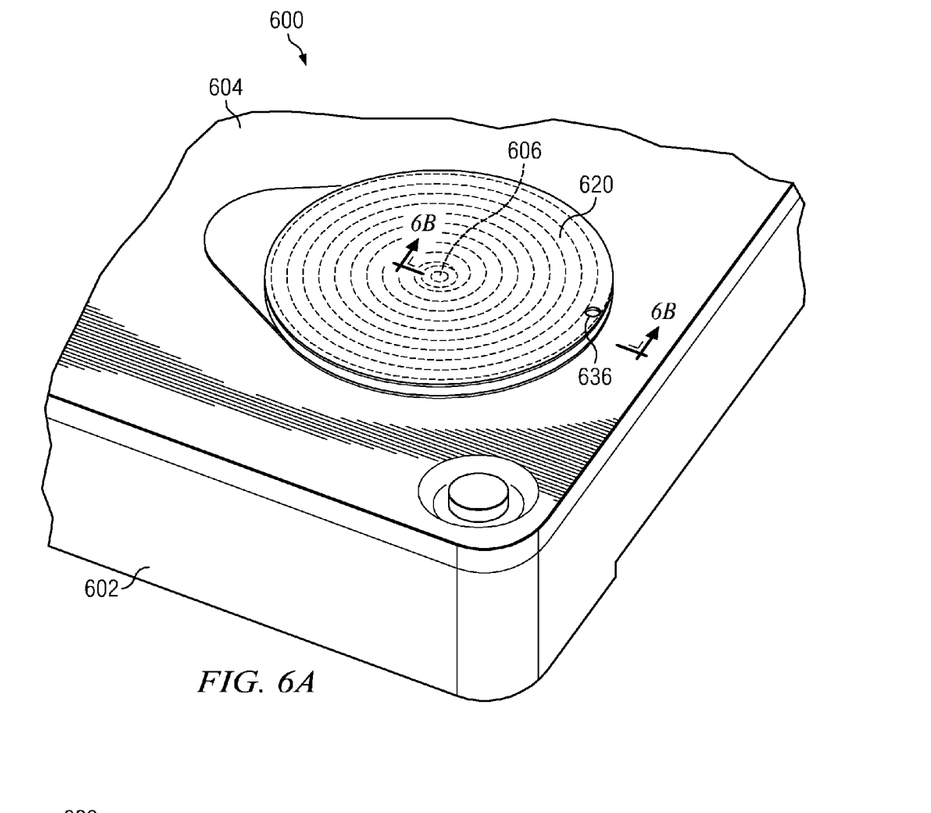
FIG. 6A is a top perspective view of a removable external labyrinth path positioned on a disk drive, according to another embodiment of the present invention.
Figure 6B:
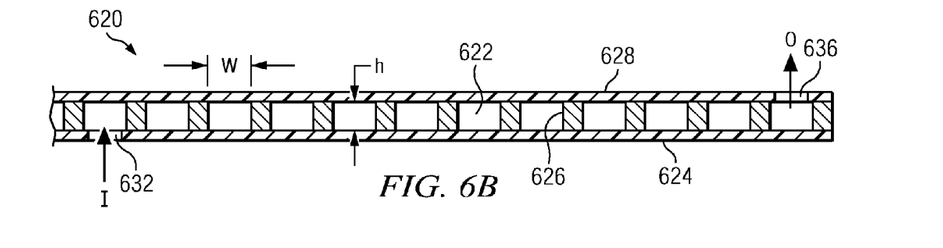
FIG. 6B is a side cross-sectional view of the removable external labyrinth path of FIG. 6A.

FIG. 6A is a top perspective view of a removable external labyrinth path 620 positioned on a disk drive 600, according to another embodiment of the present invention. FIG. 6B is a side cross-sectional view of the removable external labyrinth path 620 of FIG. 6A. Now referring to FIGS. 6A-6B, the disk drive 600 includes a disk drive base 602 to which a disk drive cover 604 is attached to form a disk drive enclosure. The disk drive enclosure includes a breather port 606 therethrough. The disk drive 600 may include a first labyrinth path (like the internal labyrinth path 332 of the breather filter 300 shown in FIG. 3) that is disposed inside the disk drive enclosure and that is in fluid connection with the breather port 606. The disk drive 600 also includes a second external labyrinth path 620 disposed outside the disk drive enclosure and in fluid connection with the breather port 606. In this regard, the first labyrinth path (internal like the internal labyrinth path 332 of the breather filter 300 shown in FIG. 3) and the second external labyrinth path 620 are both considered to be in fluid connection with the breather port 606, because they are both in the path of any flow through the breather port 606.

In the embodiment of FIGS. 6A-6B, the external labyrinth path 620 includes a channel 622 in a first layer 626 that is adhered to the disk drive enclosure (e.g. the disk drive cover 604) by means of an adhesive underlayer 624, and a second layer 628 that is adhered to the first layer 626 and that extends over at least part of the channel 622. In the embodiment of FIGS. 6A-6B, the channel 622 optionally has a spiral shape along its length. A first terminus 632 of the channel 622, and a corresponding hole in the adhesive underlayer 624, may be aligned with the breather port 606 in the disk drive cover 604, while a second terminus 636 of the channel 622 may open to the external atmosphere via a hole in the second layer 628. In this way, gas flow and diffusion from the breather port 606 to the external environment is constrained to pass through the external labyrinth path 620.

However, in the embodiment of FIGS. 6A-B, at least the second layer 628 may be removable from the disk drive 600, and in certain embodiments the layers 624, 626, 628 together may be removable from the disk drive cover 604. After such removal, gas flow and diffusion from the breather port 606 to the external environment is no longer constrained to pass through the external labyrinth path 620. Alternatively, if only a portion of the second layer 628 is removed (e.g. so that only a center portion having a radius less than that of the entire second layer 628 remains), then gas flow and diffusion from the breather port 606 to the external environment is no longer constrained to pass through any uncovered portion of the external labyrinth path 620.

In FIG. 6B, a vertical arrow labeled "I" depicts gas flow and/or diffusion from the breather port 606 in the cover 604 of the enclosure of disk drive 600, into the channel 622 of the external removable labyrinth path 620, via the first terminus 632 of channel 622. A vertical arrow labeled "O" depicts gas flow and/or diffusion from the channel 622 of the external labyrinth path 620 into the external atmosphere via the second terminus 636 of the channel 622. However, notwithstanding the direction of the arrows I and O shown in FIG. 6B, the direction of the gas flow and/or diffusion may be the reverse of that shown, so that gas flow and/or diffusion enters the disk drive 600 from the external atmosphere rather than (or in addition to) vice versa. Such gas flow and/or diffusion may be represented by arrows having the opposite sense as those shown in FIG. 6B.

In the embodiment of FIG. 6B, the first layer may define a first layer thickness "h," and the channel 622 may define a channel width "w." In certain embodiments, the first layer thickness "h" may be in the range 15 μm to 250 μm, and the channel width "w" may be in the range 50 μm to 1.6 mm. In such embodiments, the channel length along the spiral channel 622 may preferably be in the range 30 mm to 460 mm. Such dimensional ranges may advantageously control the rate of diffusion of an alternative gas like helium during a servo track writing process, in certain embodiments.

Various embodiments of the present invention may facilitate servo track writing of disk drives that include a breather port, like those described in the foregoing paragraphs. For example, air may be evacuated from the disk drive 400 shown in FIG. 4A, for example through the breather port 406 or some other opening, during a first period. Of course, air can be evacuated without all air being evacuated. Then, an alternative gas (e.g. helium) may be introduced into the disk drive 400, for example through the breather port 406, during a second period. Then, as shown in FIG. 4C, the external labyrinth path 420 may be sealed to the breather port 406 by adhesion of the removable layer 450 to the disk drive cover 404, so that flow and/or diffusion of air and the alternative gas must pass through the external labyrinth path 420 as well as through the breather port 406 in series. Any airtight coupling to the breather port, so that the removable external labyrinth path is in fluid communication with the breather port, qualifies as sealing in this context—even if there is another path or component between it and the breather port (e.g. a permanent external labyrinth path between the removable external labyrinth path and the breather port).

In certain embodiments, the foregoing steps may slow the rate of flow and/or diffusion to a first desired rate as the alternative gas is allowed to bleed out (and as air bleeds in) through the external labyrinth path 420 during a third period. Servo track writing the disk drive 400 (for example, so-called "self servo track writing") may be accomplished during the third period, under advantageous conditions. For example, in certain embodiments the use of the external labyrinth 420 may advantageously allow air to flow into the disk drive to replace lost helium. Otherwise, leakage of helium may greatly exceed replacement by air, so that the pressure inside of the disk drive may unacceptably drop and/or cause excessive deflection of the disk drive cover during servo track writing.

In certain embodiments of the present invention, the disk drive will still enclose a significant quantity of the alternative gas during the third period, while variations in outside barometric pressure may be offset by flow through the breather port 406 (rather than variations in barometric pressure causing deflection of the disk drive cover 404 to an extent that may be undesirable during track writing). For example, in certain embodiments a concentration of helium inside the disk drive 400 during the third period may be greater than 50% helium and a concentration of air inside the disk drive 400 during the third period may be less than 50% air.

After the third period, at least a portion of the external labyrinth path 420 may be unsealed, for example by removal of at least a portion of the removable layer 450. Doing this can effectively increase the rate of flow and/or diffusion to a second desired rate during normal operation of the disk drive 400 (after servo-writing has been completed). The second desired rate of flow and/or diffusion may be measured with a mixture of air and a trace percentage of alternative gas, while the first desired rate of flow and/or diffusion may be measured with a mixture of air and a substantial percentage of alternative gas. Therefore, the second desired rate of flow and/or diffusion is not necessarily greater than the first desired rate of flow and/or diffusion. Still, if measured under the same conditions and with the same gas, the second desired rate of flow and/or diffusion would be greater than the first desired rate of flow and/or diffusion.

Note that in the embodiment of FIGS. 4A-4C, the external labyrinth path 420 is sealed to the breather port 406 by adhering the removable layer 450 over the breather port 406 and over at least a portion of the external labyrinth path 420 that leads to the breather port 406. Unsealing the external labyrinth path 420 comprises removal of at least a portion of the removable layer 450. However, in the alternative embodiment of FIGS. 5A-5B, sealing the external labyrinth path 520 comprises adding the external labyrinth path 520 in fluid communication with the breather port 506, and unsealing the external labyrinth path 520 may comprise complete removal of the external labyrinth path 520 from the disk drive 500. Note also that in both of these embodiments, an internal labyrinth path (e.g. the internal labyrinth path 332 of the breather filter 300 shown in FIG. 3) is not removed after the third period.

However, in certain alternative embodiments, a temporary removable external labyrinth path (like removable external labyrinth path 550 shown in FIG. 5C) may be sealed to a permanent external labyrinth path (like external labyrinth path 420 shown in FIG. 4C, or removable external labyrinth path 520 shown in FIG. 5C), that itself is sealed to the breather port of the disk drive but not removed after the third period. In such embodiments, the permanent external labyrinth path can serve the function of the internal labyrinth path, and so in such embodiments the disk drive may not require any internal labyrinth path.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
a disk drive base;
a spindle attached to the disk drive base;
a disk mounted on the spindle;
a disk drive cover attached to the disk drive base to form a disk drive enclosure, the disk being disposed within the disk drive enclosure, the disk drive enclosure including a breather port therethrough;
a first labyrinth path disposed inside the disk drive enclosure and in fluid connection with the breather port; and
a second labyrinth path disposed outside the disk drive enclosure and in fluid connection with the breather port;
wherein the first labyrinth path defines a first path cross-sectional area and a first path length, and wherein the first path cross-sectional area is in the range 0.05 mm$^2$ to 1 mm$^2$ and the path length is in the range 5 mm to 80 mm.

2. The disk drive of claim 1 further comprising a breather filter disposed inside the disk drive enclosure, the breather filter being in fluid connection with the first labyrinth path.

3. The disk drive of claim 1 wherein the second labyrinth path includes a removable layer.

4. The disk drive of claim 3 wherein the second labyrinth path includes a channel in the disk drive enclosure and the removable layer is adhered to the disk drive enclosure, the removable layer extending over at least part of the channel.

5. The disk drive of claim 4 wherein the channel is a partial etched channel.

6. The disk drive of claim 4 wherein the channel is a formed channel.

7. The disk drive of claim 4 wherein the channel defines a greatest transverse dimension in the range 50 μm to 1.6 mm, and wherein the channel defines a channel length in the range 30 mm to 460 mm.

8. The disk drive of claim 3 wherein the second labyrinth path includes a channel in a first layer that is adhered to the disk drive enclosure, and a second layer that is adhered to the first layer and that extends over at least part of the channel, the removable layer including at least the second layer.

9. The disk drive of claim 8 wherein the first layer defines a first layer thickness in the range 15 μm to 250 μm, and wherein the channel defines a channel width in the range 50 μm to 1.6 mm, and wherein the channel defines a channel length in the range 30 mm to 460 mm.

10. The disk drive of claim 1 wherein the second labyrinth path defines a second path cross-sectional area and a second path length, and wherein the second path cross-sectional area is in the range 0.00075 mm$^2$ to 0.4 mm$^2$ and the second path length is in the range 30 mm to 460 mm.

* * * * *